US008867760B2

(12) United States Patent
Okabayashi (10) Patent No.: US 8,867,760 B2
(45) Date of Patent: Oct. 21, 2014

(54) MIXER

(75) Inventor: Masaaki Okabayashi, Hamamatsu (JP)

(73) Assignee: Yamaha Corporation (JP)

( * ) Notice: Subject to any disclaimer, the term of this patent is extended or adjusted under 35 U.S.C. 154(b) by 850 days.

(21) Appl. No.: 13/071,846

(22) Filed: Mar. 25, 2011

(65) Prior Publication Data

US 2011/0235825 A1 Sep. 29, 2011

(30) Foreign Application Priority Data

Mar. 26, 2010 (JP) ................................. 2010-071600
Mar. 26, 2010 (JP) ................................. 2010-071601

(51) Int. Cl.
*H04B 1/00* (2006.01)
*G06F 17/00* (2006.01)
*G06F 3/16* (2006.01)
*H04H 60/04* (2008.01)
*G11B 27/022* (2006.01)

(52) U.S. Cl.
CPC .............. *H04H 60/04* (2013.01); *G11B 27/022* (2013.01)
USPC .............................. 381/119; 700/94; 715/727

(58) Field of Classification Search
CPC .... H04H 60/04; G11B 27/022; G11B 27/031; G11B 27/036
USPC .............................. 700/94; 381/119; 715/727
See application file for complete search history.

(56) References Cited

U.S. PATENT DOCUMENTS

2004/0008852 A1* 1/2004 Aiso et al. ..................... 381/119
2006/0210097 A1* 9/2006 Yerrace et al. ................ 381/119
2010/0034400 A1* 2/2010 Aiso .............................. 381/119

OTHER PUBLICATIONS

Solid State Logic, "SL 9000 J Series Total Studio System Console Operator's Manual", SSL, pp. 1-131.*
Yamaha "Owners Manual" PM5D Digital Mixing console, DSP5D Digital Mixing system, PM5D/PM5D-RH V2 DSP5D, Manual, 2004 Yamaha Corporation, Japan.

* cited by examiner

*Primary Examiner* — Jesse Elbin
(74) *Attorney, Agent, or Firm* — Rossi, Kimms & McDowell LLP

(57) ABSTRACT

In a mixer, each input channel adjustment unit includes a main system unit that generates a main system signal, and a plurality of MIX send units that generate a plurality of MIX send signals. In each MIX send unit, a signal selection unit selects an audio signal from a plurality of audio signals being involved in the main system unit and including at least an audio signal to be inputted to a filter unit of the main system unit and an audio signal to be inputted to a main system gain adjustment unit. A linked gain setting unit of the MIX send unit applies a gain that increases or decreases in linking with the gain of the main system gain adjustment unit, to the audio signal that is selected by the signal selection unit. A linked ON/OFF unit of the MIX send unit sets ON state or OFF state of the audio signal that is selected by the signal selection unit in linking with the ON state or OFF state of a main system ON/OFF unit.

4 Claims, 3 Drawing Sheets

MIXER

BACKGROUND OF THE INVENTION

1. Field of the Invention

The present invention relates to a mixer that is suitable for use in mixing audio signals in a concert hall or recording studio.

2. Description of the Related Art

In a mixer that is used in a concert hall or the like, a main system audio signal (hereafter, referred to as a FOH (Front of House) audio signal) that is output toward general participants by performing effect processing or mixing of various audio signals that are supplied from input channels is generated. Moreover, audio signals for monitoring performers, or audio signals for recording are also output from the mixer. Typically, audio signals for monitoring undergo different effect processing or mixing than that of the FOH audio signal according to the role or desire of each performer. Furthermore, typically, direct audio signals on which neither effect processing nor mixing is reflected are supplied as audio signals for recording.

In order to generate a FOH audio signal, various filtering is performed on inputted audio signals, so in order to generate audio signals for monitoring or recording, typically the signal in the intermediate stage of generating the FOH audio signal is separated, after which, various processing is performed on the signals as audio signals of different system than that the main system of the FOH audio signal. Therefore, in the mixer disclosed in "PM5D/PM5D-RH V2 DSP5D Operation Manual", Yamaha, 2004", it is possible to separate the signal in the intermediate stage of generating the FOH audio signal and use those separated signals for other purposes.

Incidentally, when generating a FOH audio signal, the level of the audio signal is regulated by a fader, however, the fader level is not reflected on signals that are separated in the stage before the fader. However, in order to efficiently generate an audio signal for monitoring or an audio signal for recording, there are cases wherein it is preferable that the ON/OFF state and fader level of the FOH audio signal be reflected on those audio signals.

SUMMARY OF THE INVENTION

Taking the above situation into consideration, the object of the present invention is to provide a mixer that is capable of reflecting the ON/OFF state and fader level of the FOH audio signal on audio signals for monitoring or recording as necessary.

In order to solve the problems above, the present invention is constructed as described below. The mixer according to a first aspect of the invention comprises: a plurality of input channel adjustment units that adjust sound quality or gain of audio signals that are inputted to each of the input channel adjustment units, so that each input channel adjustment unit outputs a main system signal and a plurality of MIX send signals; a main system bus that mixes the main system signals that are outputted from the input channel adjustment units; a plurality of MIX buses that mix the MIX send signals that are outputted from the input channel adjustment units; a main system output adjustment unit that adjusts the sound quality or gain of mixed result by the main system bus, and outputs a main system output signal as adjusted result; a MIX output adjustment unit that adjusts the sound quality or gain of mixed results by the MIX buses, and outputs MIX output signals as adjusted results; and an output patch unit that assigns the main system output signal and the MIX output signals to a plurality of output ports, wherein each input channel adjustment unit comprises: a main system unit that generates the main system signal; and a plurality of MIX send units that generate the plurality of the MIX send signals, wherein each main system unit comprises: a filter unit that performs a filtering process of the audio signal inputted to the input channel adjustment unit; a main system gain adjustment unit that adjusts the gain of the audio signal that is outputted from the filter unit; and a main system ON/OFF unit that switches ON state or OFF state for controlling whether or not to supply the audio signal that is outputted from the main system gain adjustment unit to the main system bus, and wherein each MIX send unit comprises: a signal selection unit that selects an audio signal from a plurality of audio signals being involved in the main system unit and including at least an audio signal to be inputted to the filter unit and an audio signal to be inputted to the main system gain adjustment unit; a linked gain setting unit that applies a gain that increases or decreases in linking with the gain of the main system gain adjustment unit, to the audio signal that is selected by the signal selection unit; and a linked ON/OFF unit that sets ON state or OFF state of the audio signal that is selected by the signal selection unit in linking with the ON state or OFF state of the main system ON/OFF unit.

Moreover, in the construction of the mixer according to the first aspect of the invention, the ON state or OFF state that is set by the linked ON/OFF unit is the same as the ON state or OFF state that is set by the main system ON/OFF unit, and the gain set by the linked gain setting unit is the same as the gain that is set by the main system gain adjustment unit, wherein each MIX send unit further comprises: an independent ON/OFF unit that sets ON state or OFF state independently of the ON state or OFF state of the linked ON/OFF unit; and an independent gain setting unit that sets a gain independently of the gain of the linked gain setting unit, wherein the MIX send signal is placed in the ON state when both the independent ON/OFF unit and the linked ON/OFF unit are in the ON state, and is placed in the OFF state when at least one of the independent ON/OFF unit and the linked ON/OFF unit is in the OFF state, and wherein the gain applied to the MIX send signal is a combined value of the gain set by the independent gain setting unit and the gain set by the linked gain setting unit.

Furthermore, in the construction of the mixer according to the first aspect of the invention, the MIX send unit further comprises: a link ON/OFF selection unit that sets effective state or non-effective state of the linked ON/OFF unit; and a link gain selection unit that sets effective state or non-effective state of the linked gain setting unit.

A mixer according to a second aspect of the invention, the mixer comprises: a plurality of input channel adjustment units that adjust sound quality or gain of audio signals that are inputted to each input channel adjustment unit so that each input channel adjustment unit outputs a main system signal, a direct out signal and a plurality of MIX send signals; a main system bus that mixes the main system signals that are outputted from the input channel adjustment units; a plurality of MIX buses that mix the MIX send signals that are outputted from the input channel adjustment units; a main system output adjustment unit that adjusts the sound quality or gain of mixed result by the main system bus, and outputs a main system output signal as adjusted result; a MIX output adjustment unit that adjusts the sound quality or gain of mixed results by the MIX buses, and outputs MIX output signals as adjusted results; and an output patch unit that assigns the main system output signal, the MIX output signals and the direct out signal to a plurality of output ports, wherein each input channel adjustment unit comprises: a main system unit that generates the main system signal; a plurality of MIX send units that generate the plurality of the MIX send signals; and a direct out setting unit that generates the direct out signal, wherein each main system unit comprises: a filter unit that performs a filtering process of the audio signal inputted to the input channel adjustment unit; a main system gain adjustment unit that adjusts the gain of the audio signal that is outputted from the filter unit; and a main system ON/OFF unit that switches ON state or OFF state for controlling whether or not to supply the audio signal that is outputted from the main system gain adjustment unit to the main system bus, and wherein each direct out setting unit comprises: a signal selection unit that selects an audio signal from a plurality of audio signals that are involved in the main system unit and that include at least an audio signal to be inputted to the filter unit and an audio signal to be inputted to the main system gain adjustment unit; a linked gain setting unit that applies a gain that increases or decreases in linking with the gain of the main system gain adjustment unit, to the audio signal that is selected by the signal selection unit; and a linked ON/OFF unit that sets ON state or OFF state of the audio signal that is selected by the signal selection unit in linking with the ON state or OFF state of the main system ON/OFF unit.

Moreover, in the construction of the mixer according to the second aspect of the invention, the ON state or OFF state that is set by the linked ON/OFF unit is the same as the ON state or OFF state that is set by the main system ON/OFF unit; and the gain set by the linked gain setting unit is the same as the gain that is set by the main system gain adjustment unit, wherein each direct out setting unit comprises: an independent ON/OFF unit that sets ON state or OFF state independently of the ON state or OFF state of the linked ON/OFF unit; and an independent gain setting unit that sets a gain independently of the gain of the linked gain setting unit, wherein the ON state or OFF state of the direct out signal is placed in the ON state when both the independent ON/OFF unit and the linked ON/OFF unit are in the ON state, and is placed in the OFF state when at least one of the independent ON/OFF unit and the linked ON/OFF unit is in the OFF state, and wherein the gain applied to the direct out signal is a combined value of the gain set by the independent gain setting unit and the gain set by the linked gain setting unit.

Furthermore, in the construction of the mixer according to the second aspect of the invention, the direct out setting unit further comprises: a link ON/OFF selection unit that sets effective state or non-effective state of the linked ON/OFF unit; and a link gain selection unit that sets effective state or non-effective state of the linked gain setting unit.

With the present invention, the linked gain setting unit applies a gain that increases or decreases an audio signal that is selected by the signal selection unit in linking with the gain of the main system gain adjustment unit, and the linked ON/OFF unit sets the ON/OFF state for an audio signal that is selected by the signal selection unit in linking with the ON/OFF state of the main system ON/OFF state, so it is possible to reflect as necessary the ON/OFF state or fader level of the main system on an audio signal for monitoring or for recording.

DESCRIPTION OF THE PREFERRED EMBODIMENT

1. Hardware Configuration

Next, the hardware configuration of a digital mixer 1 of an embodiment of the present invention will be explained with reference to FIG. 1.

Figure 1:
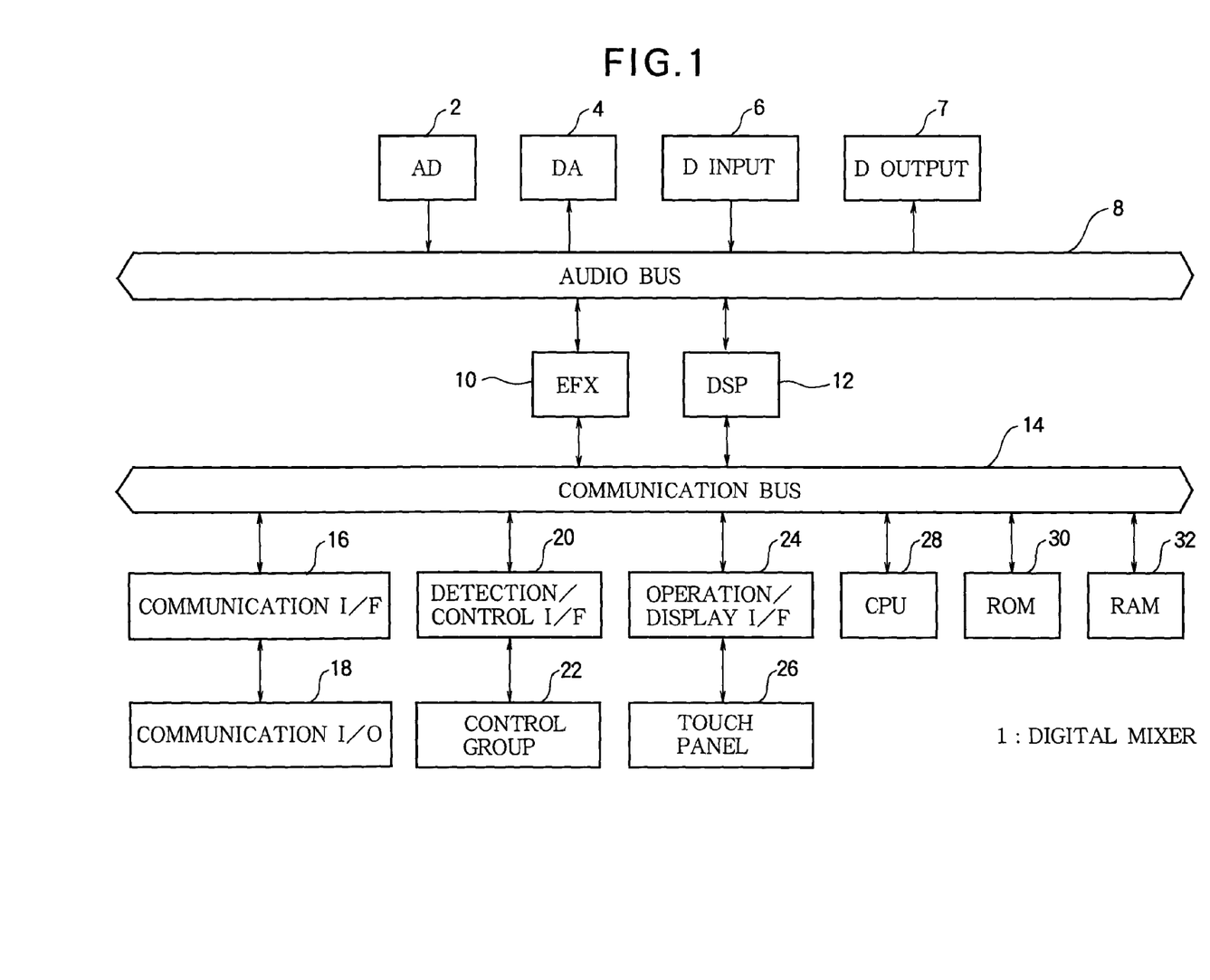
FIG. 1 is a block diagram of a digital mixer of an embodiment of the present invention.

In FIG. 1, reference numeral 2 denotes an AD converter that converts a multisystem analog audio signal that is inputted from the outside to a digital audio signal, and supplies the signal via an audio bus 8. In the figure, reference numeral 4 denotes a DA converter that converts the multisystem digital audio signal that is supplied via the audio bus 8 to an analog audio signal and outputs the signal. Reference numeral 6 denotes a digital input unit that converts the multisystem digital audio signal that is supplied from the outside to a digital signal having format for internal use, and outputs that signal via the audio bus 8. In the figure, reference numeral 7 denotes a digital output unit that converts the multisystem digital audio signal that is supplied via the audio bus 8 to a digital audio signal having the format (AES/EBU, ADAT, TASCAM and the like) of an external device and outputs that signal to the external device. Reference numeral 10 denotes an effector group that performs an effect process on a specified audio signal on the audio bus 8, and outputs the result via the audio bus 8. In the figure, 12 is a DSP (Digital Signal Processor) that performs an equalizing or mixing of audio signals on the audio bus 8 based on a specified mixing algorithm, and outputs the result via the audio bus 8.

In the figure, reference numeral 18 denotes an I/O unit that outputs a control signal that is supplied from an external device via a communication interface 16 and communication bus 14, and that outputs control signals that are supplied via the communication bus 14 and communication interface 16 to an external device. Reference numeral 22 denotes a control group that comprises controls such as an electric power fader, knobs and LED keys. In the figure, 20 is a detection/control interface that detects and outputs the operation state of controls via the communication bus 14, and that receives the operation state (for example, the amount of operation of the electric power fader and knobs, and the ON/OFF state of LED keys) via the communication bus 14 to which the controls are to be set, and reflects the received contents on the control group 22. Reference numeral 26 denotes a touch panel that comprises a flat panel display having a "1024×768" resolution for example, and touch sensors that are applied to the surface of the flat panel display. Reference numeral 24 denotes an operation/display interface that displays images specified via the communication bus 14 on the touch panel 26, and that outputs operation information detected by the touch sensors via the communication bus 14. In the figure, reference numeral 28 denotes a CPU that controls each unit via the communication bus 14 based on a control program that is stored in ROM 30. Reference numeral 32 denotes RAM that is used as work memory for the CPU 28.

2. Mixing Algorithm

Figure 2:
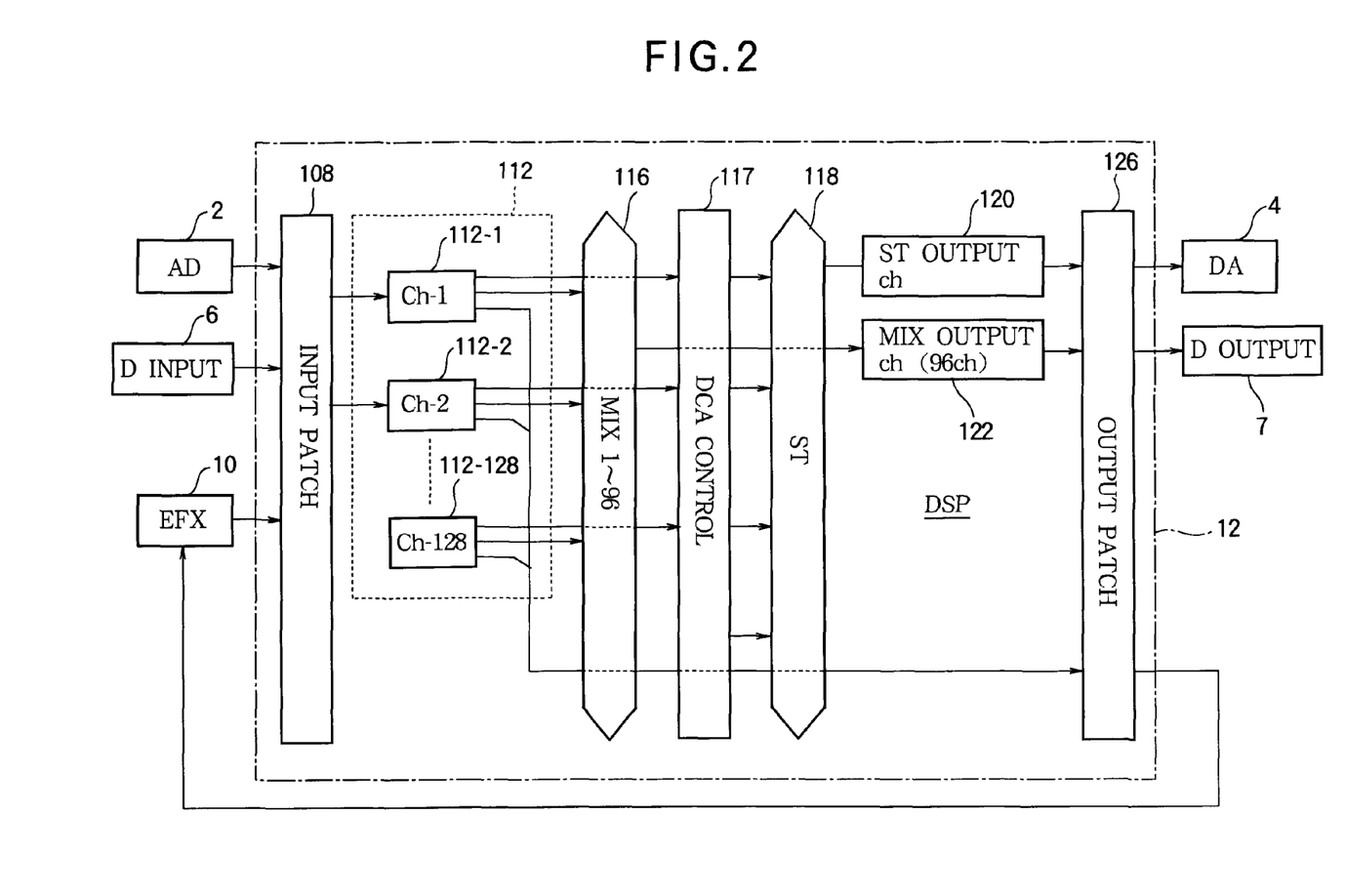
FIG. 2 is a block diagram of an algorithm for the digital mixer.

Next, the contents of the algorithm that is executed by the DSP 12 will be explained with reference to FIG. 2. That algorithm is made possible by a program that is set in the DSP 12, and that program is loaded to the DSP 12 from ROM 30 or the like. In FIG. 2, the elements 108 to 126 are achieved by the DSP 12 and the program that is loaded here.

Elements 112-1 to 112-128 are input channel adjustment units for 128 channels, and hereafter will be referred to generally as an input channel adjustment unit 112. Each input channel adjustment unit 112-1 to 112-128 performs adjustment such as volume adjustment or sound quality adjustment of the audio signal of the corresponding input channel based on operations such as the corresponding electric fader or knobs. In one input channel adjustment unit 112-N ($1 \leq N \leq 128$), the audio signal for which the volume and quality have been adjusted is supplied to each element (described later) as the stereo signal of one system, MIX send signals of ninety six systems and direct out signal of one system. In the figure, 108 is an input patch unit that assigns digital signals that are supplied from a plurality of input ports such as the AD converter 2, digital input unit 6 and the like to desired input channels of the input channel adjustment units 112. The effector group 10 comprises a maximum of 16 unit effectors that perform effect processing such as reverb, delay, modulation and the like on supplied audio signals, and supplies the result to an input channel adjustment unit 112 via the input patch unit 108.

Reference numeral 116 denotes a bus that comprises MIX buses for ninety six systems. In the following, the notation for each MIX bus will be given as "MIX bus 116-M" (where $1 \leq M \leq 96$). In each MIX bus 116-M, the MIX send signals that are supplied to the MIX bus 116 from the input change adjustment units 112-1 to 128 are mixed. Reference numeral 118 denotes a stereo bus and comprises a stereo bus of one system. The construction of the stereo bus of one system is the same as that of the MIX bus of two systems above. In the stereo bus 118, stereo signals that are supplied from the input channel adjustment units 112-1 to 112-128 are mixed. In the figure, reference numeral 117 denotes a DCA control unit that applies a gain to part of the audio signals that are supplied to the stereo bus 118 from the input channel adjustment units 112-1 to 112-128.

Here, the function of the DCA control unit 117 is explained. First, the "DCA (Digital Controlled Amplifier or Digital Controlled Attenuator)" assigns a common fader (DCA fader) that is different than the faders for the input channels to a plurality of input channels, and commonly applies the gain that is set by that DCA fader to each input channel. The DCA is mainly used for controlling the volume of large instruments such as a piano or drums or part of an orchestra. Typically, the sound from a performance of a large instrument such as a piano is collected by a plurality of microphones. The audio signals from the plurality of microphones are assigned to separate individual input channels in order to perform balance adjustment. These input channels are assigned to one DCA fader. In doing so, the balance between each of the audio signals collected from the microphones is adjusted by the faders for the input channels, and the overall volume of the instrument is adjusted by the DCA fader. Therefore, in the DCA control unit 117, the gain that is set for the DCA fader is applied to only the input channels that are assigned to a DCA fader, and the audio signals of the input channels that are not assigned to a DCA fader are supplied to the stereo bus 118 without undergoing any particular processing (in other words a gain of "0" dB is applied).

Reference numeral 120 denotes a stereo output channel unit that performs level adjustment and sound quality adjustment of the mixing result from the stereo bus 118. Reference numeral 122 denotes a MIX output channel unit that performs level adjustment and sound quality adjustment of the mixing results from the MIX busses 116-1 to 116-96. Reference numeral 126 denotes an output patch unit that assigns the output signal from the stereo output channel unit 120, output signal from the MIX output channel unit 122 and direct out signals that are outputted directly from the input adjustment units 112-1 to 112-128 to a desired output port of the DA converter 4 or digital output unit 7, or desired unit of the effector group 10.

Figure 3:
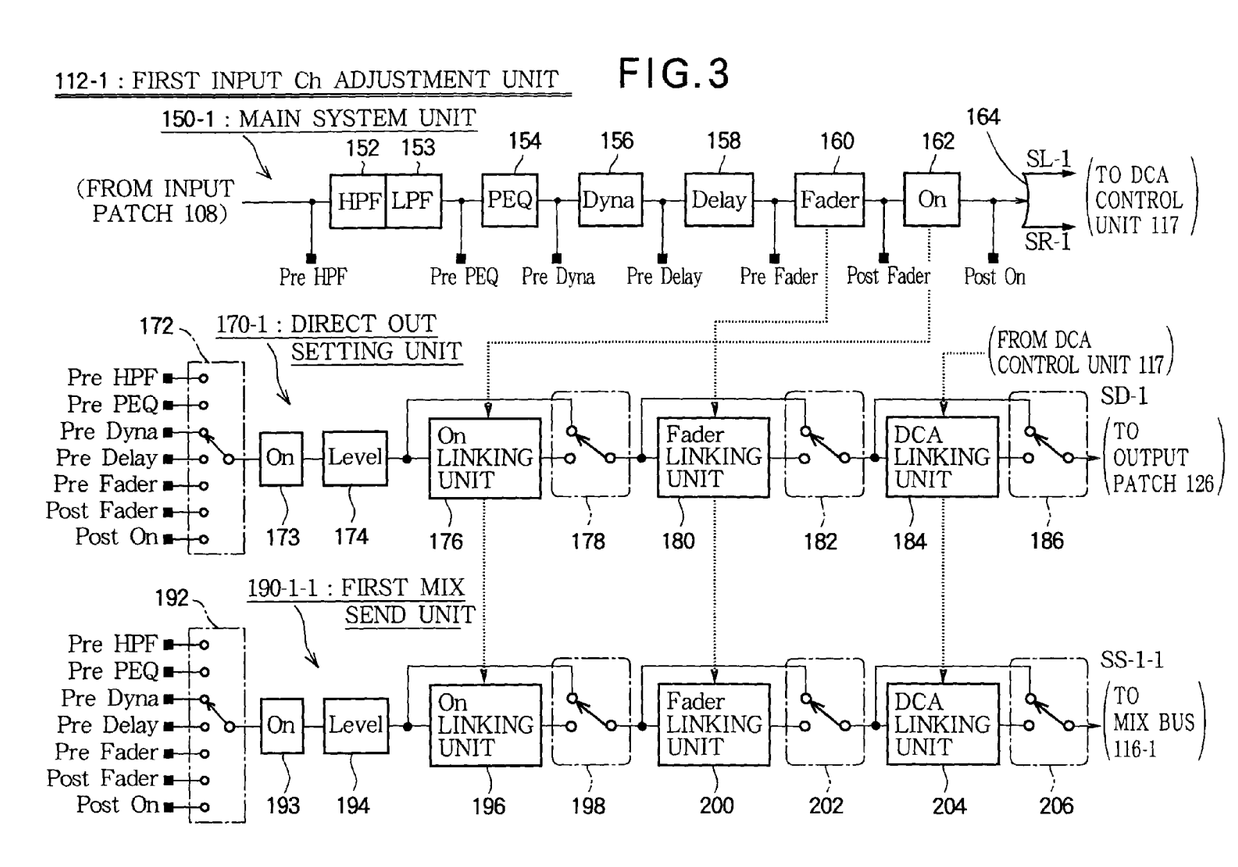
FIG. 3 is a block diagram of the main parts of the algorithm in FIG. 2.

Next, the algorithm for the input channel adjustment unit 112-1 that corresponds to the first input channel will be explained in detail with reference to FIG. 3. In FIG. 3, the input channel adjustment unit 112-1 comprises: a main system unit 150-1, direct out setting unit 170-1, first to 96th MIX send setting units 190-1-1 to 190-1-96. Construction of the second to 96th MIX send setting units 190-1-2 to 190-1-96 is the same as for the first MIX send setting unit 190-1-1, so those units are omitted from the figure. In the main system unit 150, reference numeral 152 denotes a high-pass filter unit that is provided mainly for removing low frequency noise. Reference numeral 153 denotes a low-pass filter that is provided mainly for removing high frequency noise from an input audio signal.

Reference numeral 154 denotes a parametric equalizer unit that performs sound quality adjustment of an audio signal that passes through the filter units 152, 153. In other words, the audio signal is frequency divided into four frequency bands; high frequency, intermediate high frequency, intermediate low frequency and low frequency, and the frequency characteristic is adjusted for each frequency band by a band-pass filter, low-pass filter, high-pass filter or shelving filter. Reference numeral 156 denotes a dynamic setting unit that performs decompression/compression in the dynamic range of the audio signal. Reference numeral 158 denotes a delay unit that delays the audio signal for a specified amount of time. Reference numeral 160 denotes a fader unit that operates the gain applied to an audio signal. The gain set for this fader unit 160 is adjusted by the electric power fader provided in the control group 22 that is assigned to the channel.

Reference numeral 162 denotes an ON/OFF setting unit; the ON state being set when supplying an audio signal that is outputted from the fader unit 160 to the stereo bus 118 via the control unit 117, and the OFF state being set when an audio signal is not supplied (when there is no sound). The ON/OFF state that is set by this ON/OFF setting unit 162 is switched by the LED key provided in the control group 22 that is assigned to the channel. Reference numeral 164 denotes a PAN setting unit that sets the left and right volume balance when supplying an audio signal to the stereo bus 118, and supplies the result to the DCA control unit 117 as a left signal SL-1 and right signal SR-1. Here, in the main system unit 150-1, the input audio signal to the high-pass filter unit 152 is called Pre_HPF, the input signal to the parametric equalizer unit 154 is called Pre_PEQ, the input signal to the dynamic setting unit 156 is called Pre_Dyna, the input signal to the delay unit 158 is called Pre_Delay, the input signal to the fader unit 160 is called Pre-Fader, the output signal from the fader unit 160 is called Post_Fader, and the output signal from the ON/OFF setting unit 162 is called Post_On.

Next, in the direct out setting unit 170-1, reference numeral 172 denotes a selector which is a signal selection unit that, based on a selection operation by the user, selects one signal from among the signals Pre_HPF, Pre_PEQ, Pre_Dyna, Pre_Delay, Pre_Fader, Post_Fader and Post_On above as the audio signal for direct out. Reference numeral 173 denotes an ON/OFF setting unit which is an independent ON/OFF unit; the ON state being set when supplying the audio signal selected by the selector 172 to a latter component, and the OFF state is set when no signal is supplied. The ON/OFF state that is set by the ON/OFF setting unit 173 can be freely set by operation of the control group 22 or touch panel 26. Reference numeral 174 denotes a level setting unit which is an independent gain setting unit that sets the gain applied to the audio signal that is outputted from the ON/OFF setting unit 173 based on user operation. The gain set by the level setting unit 173 can be freely set by operation of the control group 22 or touch panel 26.

Reference numeral 176 denotes an ON linking unit which is a linked ON/OFF unit, the ON/OFF state thereof being set tandem with the ON/OFF setting unit 162 of the main system unit 150-1. Reference numeral 178 denotes a follow ON switch which is a link ON/OFF selection unit, the ON/OFF state thereof being freely set by operation of the control group 22 or touch panel 26. When the follow ON switch 178 is in the ON state, the follow ON switch 178 selects the output signal from the ON linking unit 176, and when set to the OFF state (as illustrated in the figure), selects the input signal to the ON linking unit 176, and outputs the selected signal, thereby bypassing the ON linking unit 176. In other words, the follow ON switch 178 is a switch that switches between the effective/non-effective state of the ON linking unit 176.

Reference numeral 180 denotes a fader linking unit which is a linked gain setting unit that sets the gain in tandem with the fader unit 160 of the main system unit 150-1. In other words, the fader linking unit 180 applies gain to the inputted audio signal that has the same value as the gain that is set by the main system unit 150-1, and outputs the resulting signal. Reference numeral 182 denotes a follow fader switch which is a link gain selection unit, the ON/OFF state of which can be set freely by an operation of the control group 22 or touch panel 26. When the follow fader switch 182 is in the ON state, the follow fader switch 182 selects the output signal of the fader linking unit 180, and when the OFF state (as illustrated in the figure) is set, selects the input signal to the fader linking unit 180, and outputs the selected signal thereby bypassing the fader linking unit 180. In other words, the follow fader switch 182 is a switch that switches between the effective state (working state or operative state) and non-effective state (through state) of the fader linking unit 180.

Reference numeral 184 denotes a DCA linking unit that applies a gain to the inputted audio signal that has the same value as the gain that the DCA control unit 117 applies to the input channel (first input channel). In other words, when the input channel is assigned to a DCA fader, the DCA linking unit 184 sets the gain that is set by the DCA fader, and when the input channel is not assigned to a DCA fader, the DCA linking unit 184 sets a gain of 0 dB. Reference numeral 186 denotes a follow DCA switch, the ON/OFF state of which can be freely set by operation of the control group 22 or touch panel 26. When set to the ON state, the follow DCA switch 186 selects the output signal from the DCA linking unit 184 and when the OFF state (as illustrated in the figure) is set, selects the input signal to the DCA linking unit 184, and outputs the selected signal as the direct out signal SD-1. In other words, the follow DCA switch 186 is a switch that switches between the effective state and non-effective state of the DCA linking unit 184.

With the construction of the direct out setting unit 170-1 above, the direct out signal SD-1 is placed in the ON state when "both the ON/OFF setting unit 173 and ON linking unit 176 are in the ON state" or when "the ON/OFF setting unit 173 is in the ON state and the follow ON switch 178 is in the OFF state (as illustrated in the figure)". Otherwise, the direct output signal SD-1 is held in the OFF state in any other case. Moreover, when both the follow ON switch 178 ad follow DCA switch 186 are in the ON state, the gain that is finally applied to the audio signal that is selected by the selector 172 becomes a combination of the gain that is set by the level setting unit 174, the gain that is set by the fader linking unit 18 and the gain that is set by the DCA linking unit 184 (the sum of these gains on a log scale).

Next, a first MIX send setting unit 190-1-1 comprises components 192 to 206, and these components are the same as components 172 to 186 of the direct out setting unit 170-1 described above. In other words, the selector 192 which is a signal selection unit selects an audio signal from among the audio signals Pre_HPF, Pre_PEQ, Pre_Dyna, Pre_Delay, Pre_Fader, Post_Fader, Post On. the ON/OFF setting unit 193 which is an independent ON/OFF unit sets the ON/OFF state of the selected signal. The level setting unit 194 which is an independent gain setting unit sets the level of the selected signal. In addition, the ON linking unit 196 which is a linked ON/OFF unit links with the ON/OFF setting unit 162 of the main system unit 150-1, and sets the ON/OFF state of the MIX send signal in linked manner, with the effective state or non-effective state of the ON linking unit 196 being set by the follow ON switch 198 which is a link ON/OFF selection unit. Further, the fader linking unit 200 which is a linked gain setting unit links with the fader unit 160 of the main system unit 150-1, and sets the gain of the MIX send signal in linked manner, with the effective state or non-effective state of the fader linking unit 200 being set by the follow fader switch 202 which is a link gain selection unit.

The DCA linking unit 204 sets the gain to the same value of the gain applied by the DCA control unit 117 to the input channel. The follow DCA switch 206 sets the effective state (operating state or active state) or non-effective state (idling state or inactive state) of the DCA linking unit 204. Moreover, the audio signal that is output from this follow DCA switch 206 becomes the MIX send signal SS-1-1 that is supplied to the MIX bus 116-1 from the first input channel. The ON/OFF state or gain that is set for each of the components 192, 193, 194, 198, 202 and 206 can be freely set by the user by operating the control group 22 or touch panel 26.

As described above, the construction of the second to 96th MIX send setting units 190-1-2 to 190-1-96 not illustrated in the figure is the same as that of the first MIX send setting unit 190-1-1, and these units output MIX send signals SS-1-M that are supplied from each first input channel to the MIX bus 116-M ($1 \leq M \leq 96$).

Furthermore, in other input channel adjustment units 112-N ($1 \leq N \leq 128$), as in the input channel adjustment unit 112-1, a main system unit 150-N, direct out setting unit 170-N and first to 96th MIX send setting units 190-N-1 to 190-N-96 are provided.

As described above, according to the first aspect of the invention, the mixer comprises a plurality of input channel adjustment units 112-1 to 112-128 that adjust the sound quality or gain of input audio signals that are supplied to each, and that output the resulting main system signals SL-1 to SL-128, SR-1 to SR-128 and multisystem MIX send signals SS-1-1 to SS-128-96. A main system bus 118 mixes the main system signals SL-1 to SL-128, SR-1 to SR-128 that are outputted from the input channel adjustment units 112-1 to 112-128. A plurality of MIX buses 116-1 to 116-96 mix the MIX send signals SS-1-1 to SS-128-96 that are outputted from the input channel adjustment units 112-1 to 112-128. A main system output adjustment unit 120 that adjusts the sound quality or gain of the mixing results by the main system bus 118, and outputs main system output signals Lout, Rout as a result; a MIX output adjustment unit 122 adjusts the sound quality or gain of the mixing result by the MIX buses 116-1 to 116-96, and outputs a MIX output signal as the result. An output patch unit 126 freely assigns the main system output signals Lout, Rout and the MIX output signals to a plurality of output ports 4, 7, 10. The input channel adjustment units 112-1 to 112-128 comprise main system units 150-1 to 150-128 that generate the main system signals SL-1 to SL-128, and a plurality of MIX send units 190-1-1 to 190-128-96 that generate the MIX send signals SS-1-1 to SS-128-96. The main system units 150-1 to 150-128 comprise filter units 152, 153, 154 that perform a filtering process of an inputted audio signal, a main system gain adjustment unit 160 that adjusts the gain of the audio signal that is outputted from the filter units 152, 153, 154, and a main system ON/OFF unit 162 that switches whether or not to supply the audio signal that is outputted from the main system gain adjustment unit 160 to the main system bus 118. The MIX send units 190-1-1 to 190-128-96 comprise a signal selection unit 192 that selects an audio signal from a plurality of signals that are involved in the main system units 150-1 to 150-128 and that include at least an input signal Pre_HPF to be input to the filter units 152, 153, 154 and an input signal Pre_Fader to be input to the main system gain adjustment unit 160, a linked gain setting unit 200 that applies a gain that increases or decreases the audio signal that is selected by the signal selection unit 192 in linking with the gain of the main system gain adjustment unit 160, and a linked ON/OFF unit 196 that sets the ON/OFF state of the audio signal that is selected by the signal selection unit 192 in linking with the ON/OFF state of the main system ON/OFF unit 162.

Moreover, in the construction of the mixer according to the first aspect of the invention, the ON/OFF state that is set by the linked ON/OFF unit 196 is the same as the ON/OFF state that is set by the main system ON/OFF unit 162. The gain set by the linked gain setting unit 200 is the same as the gain that is set by the main system gain adjustment unit 160. The MIX send units 190-1-1 to 190-128-96 further comprise an independent ON/OFF unit 193 that can set an ON/OFF state that is independent of the ON/OFF state of the linked ON/OFF unit 196, and an independent gain setting unit 194 that can set gain that is independent of the gain of the linked gain setting unit 200. The ON/OFF state of the MIX send signals SS-1-1 to SS-128-96 is placed in the ON state when both the independent ON/OFF unit 193 and the linked ON/OFF unit 196 are in the ON state, and is in the OFF state when at least one of the independent ON/OFF unit 193 and linked ON/OFF unit 196 is in the OFF state. The gain applied to the MIX send signals SS-1-1 to SS-128-96 is a combined value of the gain set by the independent gain setting unit 194 and the gain set by the linked gain setting unit 200.

Furthermore, in the construction of the mixer according to the first aspect of the invention, the MIX send units 190-1-1 to 190-128-96 further comprise a link ON/OFF selection unit 198 that sets the effective state or non-effective state of the linked ON/OFF unit 196, and a link gain selection unit 202 that sets the effective state or non-effective state of the linked gain setting unit 200.

According to a second aspect of the invention, the input channel adjustment units 112-1 to 112-128 comprise main system units 150-1 to 150-128 that generate the main system signals SL-1 to SL-128, a plurality of MIX send units 190-1-1 to 190-128-96 that generate the MIX send signals SS-1-1 to SS-128-96, and direct out setting units 170-1 to 170-128 that generate the direct out signals SD-1 to SD-128. The direct out setting units 170-1 to 170-128 comprise a signal selection unit 172 that selects an audio signal from a plurality of audio signals that are involved in the main system units 150-1 to 150-128 and that include at least an input signal Pre_HPF to be input to the filter units 152, 153, 154 and an input signal Pre_Fader to be input to the main system gain adjustment unit 160, a linked gain setting unit 180 that applies a gain that increases or decreases the audio signal that is selected by the signal selection unit 172 in linking with the gain of the main system gain adjustment unit 160, and a linked ON/OFF unit 176 that sets the ON/OFF state of the audio signal that is selected by the signal selection unit 172 in linking with the ON/OFF state of the main system ON/OFF unit 162.

Moreover, in the construction of the mixer according to the second aspect of the invention, the ON/OFF state that is set by the linked ON/OFF unit 176 is the same as the ON/OFF state that is set by the main system ON/OFF unit 162. The gain set by the linked gain setting unit 180 is the same as the gain that is set by the main system gain adjustment unit 160. The direct out setting units 170-1 to 170-128 comprise, an independent ON/OFF unit 173 that can set an ON/OFF state that is independent of the ON/OFF state of the linked ON/OFF unit 176, and an independent gain setting unit 174 that can set gain that is independent of the gain of the linked gain setting unit 180. The ON/OFF state of the direct out signals SD-1 to SD-128 is placed in the ON state when both the independent ON/OFF unit 173 and the linked ON/OFF unit 176 are in the ON state, and is placed in the OFF state when at least one of the independent ON/OFF unit 173 and the linked ON/OFF unit 176 is in the OFF state. The gain applied to the direct out signals SD-1 to SD-128 is a combined value of the gain set by the independent gain setting unit 174 and the gain set by the linked gain setting unit 180.

Furthermore, in the construction of the mixer according to the second aspect of the invention, the direct out setting units 170-1 to 170-128 further comprise a link ON/OFF selection unit 178 that sets the effective state or non-effective state of the linked ON/OFF unit 176, and a link gain selection unit 182 that sets the effective state or non-effective state of the linked gain setting unit 180.

3. Operation of the Embodiment

In the construction that is illustrated in FIG. 3, when the selector 172 selects the signal Pre_HPF, it is possible to generate a direct out signal SD-1 that is not affected at all by the filter units 152, 153, parametric equalizer unit 154, dynamic setting unit 156 and delay unit 158 of the main system unit 150-1.

Here, when the follow ON switch 178 is set to the ON state, the direct output signal SD-1 can automatically be set ON or OFF in linking with the ON/OFF setting unit 162 of the main system unit 150-1. Moreover, when the follow fader switch 182 is set to the ON state, the signal level of the direct out signal SD-1 is automatically increased or decreased in linking with the fader level of the main system unit 150-1. Furthermore, when the follow DCA switch 186 is set to the ON state, the signal level of the direct out signal SD-1 can be automatically increased or decreased in linking with the DCA fader 117 that is assigned to the first input channel.

This is also the same for the first to 96th MIX send setting units 190-1-1 to 190-1-96, and with the effect of the filter units 153 and 153 eliminated, it is possible to reflect the set state of the ON/OFF setting unit 162 on the MIX send signal SS-1-1 to SS-1-96.

4. Variation

The present invention is not limited to the embodiment described above, for example, various variations are possible as described below.

(1) In the embodiment above, various operations are achieved by a program that is set in the digital mixer, however, this program alone can be stored and distributed on a recording medium such as CD-ROM or a memory card, or can be distributed via a transmission path.

(2) Moreover, the embodiment above is an example of applying the present invention to a digital mixer, however, the present invention can also be applied to an analog mixer that performs processing such as amplification and switching of an analog audio signal.

What is claimed is:

1. A mixer comprising:
a plurality of input channel adjustment units that adjust sound quality or gain of audio signals that are inputted to each of the input channel adjustment units, so that each input channel adjustment unit outputs a main system signal and a plurality of MIX send signals;
a main system bus that mixes the main system signals that are outputted from the input channel adjustment units;
a plurality of MIX buses that mix the MIX send signals that are outputted from the input channel adjustment units;
a main system output adjustment unit that adjusts the sound quality or gain of mixed result by the main system bus, and outputs a main system output signal as adjusted result;
a MIX output adjustment unit that adjusts the sound quality or gain of mixed results by the MIX buses, and outputs MIX output signals as adjusted results; and
an output patch unit that assigns the main system output signal and the MIX output signals to a plurality of output ports,
wherein each input channel adjustment unit comprises: a main system unit that generates the main system signal; and a plurality of MIX send units that generate the plurality of the MIX send signals,
wherein each main system unit comprises: a filter unit that performs a filtering process of the audio signal inputted to the input channel adjustment unit; a main system gain adjustment unit that adjusts the gain of the audio signal that is outputted from the filter unit; and a main system ON/OFF unit that switches ON state or OFF state for controlling whether or not to supply the audio signal that is outputted from the main system gain adjustment unit to the main system bus, and
wherein each MIX send unit comprises: a signal selection unit that selects an audio signal from a plurality of audio signals being involved in the main system unit and including at least an audio signal to be inputted to the filter unit and an audio signal to be inputted to the main system gain adjustment unit; a linked gain setting unit that applies a gain that increases or decreases in linking with the gain of the main system gain adjustment unit, to the audio signal that is selected by the signal selection unit; and a linked ON/OFF unit that sets ON state or OFF state of the audio signal that is selected by the signal selection unit in linking with the ON state or OFF state of the main system ON/OFF unit;
wherein the ON state or OFF state that is set by the linked ON/OFF unit is the same as the ON state or OFF state that is set by the main system ON/OFF unit, and the gain set by the linked gain setting unit is the same as the gain that is set by the main system gain adjustment unit,
wherein each MIX send unit further comprises: an independent ON/OFF unit that sets ON state or OFF state independently of the ON state or OFF state of the linked ON/OFF unit; and an independent gain setting unit that sets a gain independently of the gain of the linked gain setting unit,
wherein the MIX send signal is placed in the ON state when both the independent ON/OFF unit and the linked ON/OFF unit are in the ON state, and is placed in the OFF state when at least one of the independent ON/OFF unit and the linked ON/OFF unit is in the OFF state, and
wherein the gain applied to the MIX send signal is a combined value of the gain set by the independent gain setting unit and the gain set by the linked gain setting unit.

2. A mixer comprising:
a plurality of input channel adjustment units that adjust sound quality or gain of audio signals that are inputted to each of the input channel adjustment units, so that each input channel adjustment unit outputs a main system signal and a plurality of MIX send signals;
a main system bus that mixes the main system signals that are outputted from the input channel adjustment units;
a plurality of MIX buses that mix the MIX send signals that are outputted from the input channel adjustment units;
a main system output adjustment unit that adjusts the sound quality or gain of mixed result by the main system bus, and outputs a main system output signal as adjusted result;
a MIX output adjustment unit that adjusts the sound quality or gain of mixed results by the MIX buses, and outputs MIX output signals as adjusted results; and
an output patch unit that assigns the main system output signal and the MIX output signals to a plurality of output ports,
wherein each input channel adjustment unit comprises: a main system unit that generates the main system signal; and a plurality of MIX send units that generate the plurality of the MIX send signals,
wherein each main system unit comprises: a filter unit that performs a filtering process of the audio signal inputted to the input channel adjustment unit; a main system gain adjustment unit that adjusts the gain of the audio signal that is outputted from the filter unit; and a main system ON/OFF unit that switches ON state or OFF state for controlling whether or not to supply the audio signal that is outputted from the main system gain adjustment unit to the main system bus, and
wherein each MIX send unit comprises: a signal selection unit that selects an audio signal from a plurality of audio signals being involved in the main system unit and including at least an audio signal to be inputted to the filter unit and an audio signal to be inputted to the main system gain adjustment unit; a linked gain setting unit that applies a gain that increases or decreases in linking with the gain of the main system gain adjustment unit, to the audio signal that is selected by the signal selection unit; and a linked ON/OFF unit that sets ON state or OFF state of the audio signal that is selected by the signal selection unit in linking with the ON state or OFF state of the main system ON/OFF unit;
wherein the MIX send unit further comprises: a link ON/OFF selection unit that sets effective state or non-effective state of the linked ON/OFF unit; and a link gain selection unit that sets effective state or non-effective state of the linked gain setting unit.

3. A mixer comprising:
a plurality of input channel adjustment units that adjust sound quality or gain of audio signals that are inputted to each input channel adjustment unit so that each input channel adjustment unit outputs a main system signal, a direct out signal and a plurality of MIX send signals;

a main system bus that mixes the main system signals that are outputted from the input channel adjustment units;

a plurality of MIX buses that mix the MIX send signals that are outputted from the input channel adjustment units;

a main system output adjustment unit that adjusts the sound quality or gain of mixed result by the main system bus, and outputs a main system output signal as adjusted result;

a MIX output adjustment unit that adjusts the sound quality or gain of mixed results by the MIX buses, and outputs MIX output signals as adjusted results; and an output patch unit that assigns the main system output signal, the MIX output signals and the direct out signal to a plurality of output ports, wherein each input channel adjustment unit comprises: a main system unit that generates the main system signal; a plurality of MIX send units that generate the plurality of the MIX send signals; and a direct out setting unit that generates the direct out signal, wherein each main system unit comprises: a filter unit that performs a filtering process of the audio signal inputted to the input channel adjustment unit; a main system gain adjustment unit that adjusts the gain of the audio signal that is outputted from the filter unit; and a main system ON/OFF unit that switches ON state or OFF state for controlling whether or not to supply the audio signal that is outputted from the main system gain adjustment unit to the main system bus, and wherein each direct out setting unit comprises: a signal selection unit that selects an audio signal from a plurality of audio signals that are involved in the main system unit and that include at least an audio signal to be inputted to the filter unit and an audio signal to be inputted to the main system gain adjustment unit; a linked gain setting unit that applies a gain that increases or decreases in linking with the gain of the main system gain adjustment unit, to the audio signal that is selected by the signal selection unit; and a linked ON/OFF unit that sets ON state or OFF state of the audio signal that is selected by the signal selection unit in linking with the ON state or OFF state of the main system ON/OFF unit;

wherein the ON state or OFF state that is set by the linked ON/OFF unit is the same as the ON state or OFF state that is set by the main system ON/OFF unit; and the gain set by the linked gain setting unit is the same as the gain that is set by the main system gain adjustment unit, wherein each direct out setting unit comprises: an independent ON/OFF unit that sets ON state or OFF state independently of the ON state or OFF state of the linked ON/OFF unit; and an independent gain setting unit that sets a gain independently of the gain of the linked gain setting unit, wherein the ON state or OFF state of the direct out signal is placed in the ON state when both the independent ON/OFF unit and the linked ON/OFF unit are in the ON state, and is placed in the OFF state when at least one of the independent ON/OFF unit and the linked ON/OFF unit is in the OFF state, and wherein the gain applied to the direct out signal is a combined value of the gain set by the independent gain setting unit and the gain set by the linked gain setting unit.

4. A mixer comprising:

a plurality of input channel adjustment units that adjust sound quality or gain of audio signals that are inputted to each input channel adjustment unit so that each input channel adjustment unit outputs a main system signal, a direct out signal and a plurality of MIX send signals;

a main system bus that mixes the main system signals that are outputted from the input channel adjustment units;

a plurality of MIX buses that mix the MIX send signals that are outputted from the input channel adjustment units;

a main system output adjustment unit that adjusts the sound quality or gain of mixed result by the main system bus, and outputs a main system output signal as adjusted result;

a MIX output adjustment unit that adjusts the sound quality or gain of mixed results by the MIX buses, and outputs MIX output signals as adjusted results; and an output patch unit that assigns the main system output signal, the MIX output signals and the direct out signal to a plurality of output ports, wherein each input channel adjustment unit comprises: a main system unit that generates the main system signal; a plurality of MIX send units that generate the plurality of the MIX send signals; and a direct out setting unit that generates the direct out signal, wherein each main system unit comprises: a filter unit that performs a filtering process of the audio signal inputted to the input channel adjustment unit; a main system gain adjustment unit that adjusts the gain of the audio signal that is outputted from the filter unit; and a main system ON/OFF unit that switches ON state or OFF state for controlling whether or not to supply the audio signal that is outputted from the main system gain adjustment unit to the main system bus, and wherein each direct out setting unit comprises: a signal selection unit that selects an audio signal from a plurality of audio signals that are involved in the main system unit and that include at least an audio signal to be inputted to the filter unit and an audio signal to be inputted to the main system gain adjustment unit; a linked gain setting unit that applies a gain that increases or decreases in linking with the gain of the main system gain adjustment unit, to the audio signal that is selected by the signal selection unit; and a linked ON/OFF unit that sets ON state or OFF state of the audio signal that is selected by the signal selection unit in linking with the ON state or OFF state of the main system ON/OFF unit;

wherein the direct out setting unit further comprises: a link ON/OFF selection unit that sets effective state or non-effective state of the linked ON/OFF unit; and a link gain selection unit that sets effective state or non-effective state of the linked gain setting unit.

\* \* \* \* \*